(12) United States Patent
Semenov et al.

(10) Patent No.: US 11,791,652 B2
(45) Date of Patent: Oct. 17, 2023

(54) DC CURRENT REGULATOR WITH SUPERCAPACITOR

(71) Applicant: KOLLMORGEN CORPORATION, Radford, VA (US)

(72) Inventors: Boris Semenov, Southborough, MA (US); Christian Rolf Jakschies, Mettmann (DE); George Borkey Yundt, Andover, MA (US); Kerim Feiler, Langenfeld (DE); Lars Lindner, Essen (DE); Michael Capelle, Duesseldorf (DE); Robert Pearce, Bristol (GB); Sergio Maggioni, Cernusco sul Naviglio (IT); Silvio Dus, Duisburg (DE)

(73) Assignee: KOLLMORGEN CORPORATION, Radford, VA (US)

( * ) Notice: Subject to any disclaimer, the term of this patent is extended or adjusted under 35 U.S.C. 154(b) by 131 days.

(21) Appl. No.: 17/037,004

(22) Filed: Sep. 29, 2020

(65) Prior Publication Data

US 2021/0159721 A1 May 27, 2021

Related U.S. Application Data

(60) Provisional application No. 62/938,824, filed on Nov. 21, 2019.

(51) Int. Cl.
*H02J 7/34* (2006.01)
*H02J 7/00* (2006.01)

(52) U.S. Cl.
CPC ............ *H02J 7/345* (2013.01); *H02J 7/0063* (2013.01)

(58) Field of Classification Search
CPC .......... H02J 7/345; H02J 7/0063; H02J 7/007
See application file for complete search history.

(56) References Cited

U.S. PATENT DOCUMENTS

| 7,331,426 | B2 | 2/2008 | Jahkonen |
| 8,723,490 | B2 | 5/2014 | Moussaoui et al. |
| 10,516,365 | B1 * | 12/2019 | Serban ................. H02M 7/487 |
| 10,611,253 | B2 * | 4/2020 | Croset .................... B60L 53/53 |
| 10,707,746 | B1 * | 7/2020 | Xiong ................. H02M 1/4225 |
| 10,811,892 | B2 * | 10/2020 | Juntunen ............... H02J 7/0068 |

(Continued)

FOREIGN PATENT DOCUMENTS

EP          1586527 A1    10/2005

OTHER PUBLICATIONS

International Search Report and Written Opinion issued in related international application No. PCT/US2020/053289, dated Jan. 20, 2021. (12 pages).

*Primary Examiner* — Richard Isla
*Assistant Examiner* — Sadia Kousar
(74) *Attorney, Agent, or Firm* — Day Pitney LLP; Anthony A. Kassas; George N. Chaclas

(57) ABSTRACT

A power control system is provided for AC mains, including an input bridge rectifier connected to the AC power mains, and a buck regulator circuit connected to the DC output of the input bridge rectifier, the output of the buck regulator circuit providing a DC power output bus. A current sensor is connected to the output of the buck regulator circuit, and one or more capacitors is connected across the DC power output bus for receiving current from the buck regulator circuit. The buck regulator circuit is controlled to limit peak output current thereof.

20 Claims, 2 Drawing Sheets

(56) References Cited

U.S. PATENT DOCUMENTS

| | | | |
|---|---|---|---|
| 2003/0102845 A1* | 6/2003 | Aker | H02J 7/0042 |
| | | | 320/140 |
| 2007/0008754 A1* | 1/2007 | Reynolds | H02M 3/155 |
| | | | 363/60 |
| 2009/0140706 A1* | 6/2009 | Taufik | H02M 3/1584 |
| | | | 323/272 |
| 2009/0153083 A1* | 6/2009 | Rozman | H02P 23/14 |
| | | | 318/400.11 |
| 2010/0148714 A1* | 6/2010 | Okita | G05B 19/404 |
| | | | 318/561 |
| 2011/0309811 A1 | 12/2011 | Kondo et al. | |
| 2013/0026958 A1 | 1/2013 | Adiga-Manoor et al. | |

* cited by examiner

DC CURRENT REGULATOR WITH SUPERCAPACITOR

CROSS REFERENCE TO RELATED APPLICATION

This application claims priority of U.S. Patent Application No. 62/938,824 entitled "DC Current Regulator with Supercapacitor" filed with the United States Patent and Trademark Office on Nov. 21, 2019, which is incorporated herein by reference in its entirety.

FIELD OF THE INVENTION

The present invention is directed to a system for regulating the DC bus current for one or more motor drives using a supercapacitor. Such DC bus systems may be found in automated machinery and other electrically-driven equipment in the fields of avionics, transportation, medical equipment, mechanical handling and process control.

BACKGROUND

There is an increasing requirement for efficiency in automated machinery. Previously, the tendency has been to develop elements such as motors and drives that are individually more efficient. There are opportunities, however, to save energy by considering the system as a whole and, consequently, one energy saving method is to arrange for motor drives to share a common DC bus. If the nature of the system is that some motors are regenerating power to the DC bus while other motors are extracting power from the DC bus, then power can be saved by exchanging energy between regenerating and motoring axes via the DC bus. Simultaneous regeneration and motoring, however, is only encountered in certain types of machinery. It may be that, at a given time, most/all motors of such machinery are extracting power from the DC bus or that most/all motors are regenerating power to the DC bus. Therefore, it is usually necessary to fit a power shedding circuit to the DC bus, such as braking resistor and switch, so that any surplus of regenerative energy can be dissipated without driving the DC bus to voltages so high that the equipment will suffer damage. Ideally, there would be enough energy storage in the system that the energy recovered from motors that have been regenerating could be stored and then used at a later time in the machine cycle when power is required by the same or other motors in the system.

A supercapacitor is a special type of capacitor that typically stores 10 to 100 times more energy per unit volume than electrolytic capacitors. A supercapacitor can accept and deliver charge much faster than rechargeable batteries, and it tolerates many more charge and discharge cycles than batteries. Supercapacitors have very low internal resistance and very high current capacity. It is these very advantages, however, that can create difficulties in their application—especially with regard to the initial charging process.

DESCRIPTION OF RELATED ART

Supercapacitors have been used in motor drive systems to provide emergency movement when the mains power is unavailable, or to supply short term power before power becomes available from a battery.

U.S. Pat. No. 7,331,426B2 teaches an elevator system which incorporates a supercapacitor that can be selectively coupled to the DC bus for charging and discharging. The supercapacitor is actively managed: it is charged when the mains power is present, it can be then be disconnected and only re-connected when an emergency movement of the elevator car is required.

U.S. Pat. No. 8,723,490B2 teaches a system where a battery holds up a low voltage DC bus and a bi-directional power converter that is coupled to a supercapacitor that can be used for shorter term energy storage than is offered by the battery. The supercapacitor is actively managed: it is charged to a higher voltage than the battery when the converter is operated in boost mode, power can be transferred back to the DC bus when the converter is operated in buck mode.

Although the prior art generally provides supercapacitors used for short-term energy storage, the prior art does not teach a supercapacitor directly connected to the common DC bus of motor drives.

SUMMARY OF THE INVENTION

In accordance with one aspect of the invention, a supercapacitor may be fitted to a DC bus to provide an energy store. A supercapacitor fitted to a DC bus may also support peak demands of short duration. It may be appreciated that an important consideration when designing a machine is to limit and, if possible, reduce the peak power consumption. This allows more machines to be installed for a given capacity of mains supply and/or may allow a machine to operate with a reduced capacity mains supply.

A first embodiment of the disclosed invention provides a bridge rectifier supplied by mains supply, a smoothing capacitor, a buck regulator, a current sensor that measures the output current of the buck regulator. A control circuit for the buck regulator is provided, and an output capacitor is connected to the output of the buck regulator, thereby forming the DC bus. The output capacitor comprises a supercapacitor in parallel with an electrolytic capacitor, or optionally only an electrolytic capacitor or optionally only a supercapacitor. The buck regulator charges the output capacitor before any load is applied to the DC bus.

A second embodiment of the disclosed invention extends the first embodiment by further providing a multiphase buck converter.

DETAILED DESCRIPTION OF THE DRAWINGS

Figure 1:
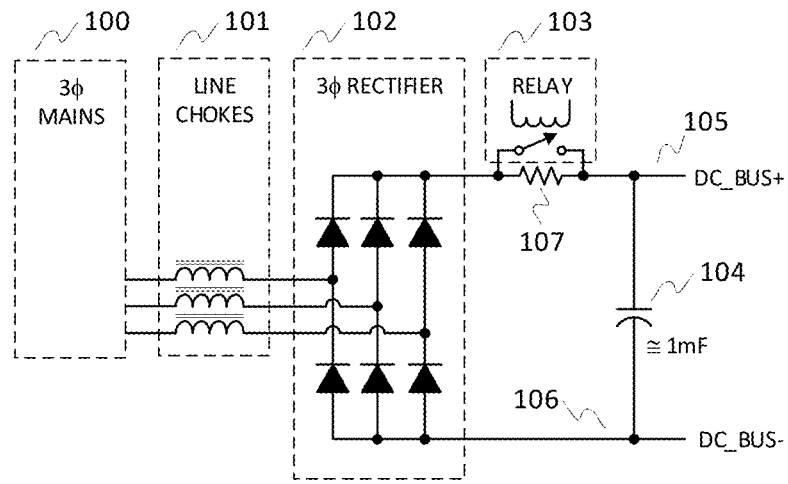
FIG. 1 is a prior art DC link circuit where the charge current of the bus capacitor is limited by a resistor.

FIG. 1 shows a prior art scheme for creating a DC bus. The mains supply 100 is presented to line chokes 101 and then to a bridge rectifier 102. At power-on, current will flow through resistor 107 and subsequently into the DC bus capacitor 104. After a few seconds the DC bus capacitor 104 will be fully charged and the control circuit (not illustrated) will energize the relay 103 bypassing resistor 107. After the DC bus capacitor 104 is fully charged, it is then possible to operate motor drives that are attached to the DC conductors 105 and 106. Resistor 107, relay 103 and the related control circuit (not illustrated) may be referred to as the "pre-charge circuit." Charging of the DC bus capacitor before operating the loads may be referred to as the "pre-charge process." It may be appreciated that inclusion of line chokes 101 extend the current pulses that are drawn from the supply.

It will also be appreciated that elements 100, 101 and 102 are illustrated as being in a three-phase configuration, which is typical for machinery in the range 3 kW-100 kW range, but the principles of this invention apply equally to other phase configurations as well.

The DC bus capacitor 104 performs several functions. For example, it limits the voltage ripple on the DC bus 105 and 106, it provides a return path for harmonic currents drawn by loads attached to the DC bus, and it holds up the DC bus for several milliseconds in the event that the mains supply 100 suffer a momentary interruption (e.g., a "brown-out"). Preferably, capacitor 104 may be implemented as a bank of electrolytic capacitors with a total capacitance on the order of 1 mF.

Achieving the desired voltage rating of a capacitor may require the series connection of two or more capacitors. Achieving the desired capacitance and current ratings of a capacitor may require the series connection of two or more capacitors. Therefore, although a single capacitor is illustrated in FIG. 1 as 104, the capacitance may be realized as a bank of capacitors. It will be appreciated that this applies to all capacitors in FIG. 2, FIG. 3 and FIG. 4.

The pre-charge process should be completed before the DC bus 105 and 106 can be loaded. Otherwise, there will be additional dissipation in resistor 107 before relay contact 103 is closed.

Figure 2:
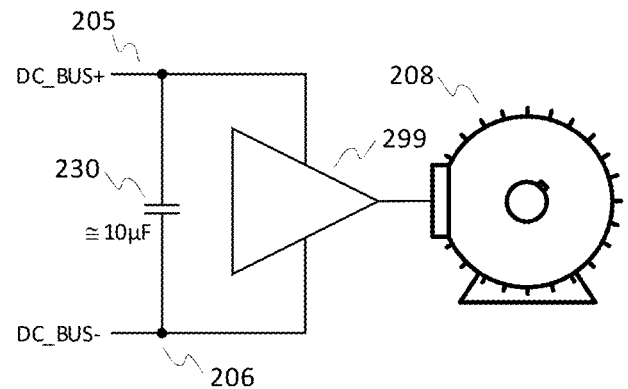
FIG. 2 is a prior art drive comprising a decoupling capacitor and an amplifier coupled to a motor.

FIG. 2 shows a prior art combination of an amplifier 299 with an attached motor 208. In most cases the amplifier 299 will be a PWM switching amplifier. A decoupling capacitor 230 local to the amplifier 299 provides a path for currents at the PWM switching frequency. In practice, capacitor 230 may be implemented as a bank of film capacitors with a total capacitance of approximately 10 µF. Motor 208 can be of any type, but DC servo, permanent magnet AC servo and induction motors are the most common. All of these motor types are capable of regenerating power from a mechanical load back onto the DC bus 105 and 106.

There can be one or more instances of amplifier-motor combinations attached to the DC bus. A multi axis drive system sharing a DC bus can be implemented as one instance of FIG. 1 connected to one or more instances of FIG. 2.

It will be appreciated that the selection of resistor 107 is constrained by the specified pre-charge time, e.g., five seconds, and the consequent transient power dissipation. By way of example, if the rectified DC voltage is 532V, and resistor 107 is 470Ω, then a 1 mF capacitor 104 will be 99.6% charged after 3 seconds. The initial power dissipation in resistor 107 will be 600 W but would decline to 100 W after 450 ms. Therefore, use of a resistor with a steady-state rating of 100 W is practicable.

In accordance with the instant invention, the DC bus capacitor 104 is augmented by adding a supercapacitor connected in parallel to capacitor 104. A supercapacitor may have a capacitance on the order of Farads.

Accordingly, the circuit of FIG. 1 may be modified by connecting a supercapacitor of one Farad between DC bus 105 and 106. By way of a non-limiting example, if resistor 107 were 56Ω and the charging current limited to 10 A, this would require resistor 107 to be rated for 5 kW transiently.

That is approximately 1 kW in the steady state. Further, even after 4 minutes, the supercapacitor would be only 98% charged. A substantial and possibly damaging transient in-rush current would flow if relay contact 107 were closed at that time, or when recovering from a momentary interruption to the mains supply 100. Therefore, although the prior art circuit of FIG. 1 can be adapted to perform the pre-charging of a supercapacitor, the consequent significant energy consumption in resistor 107, the extensive time taken for pre-charging the bus capacitance, the incomplete charging of the bus capacitance, and the in-rush currents that can flow are all unacceptable disadvantages that this invention overcomes.

Figure 3:
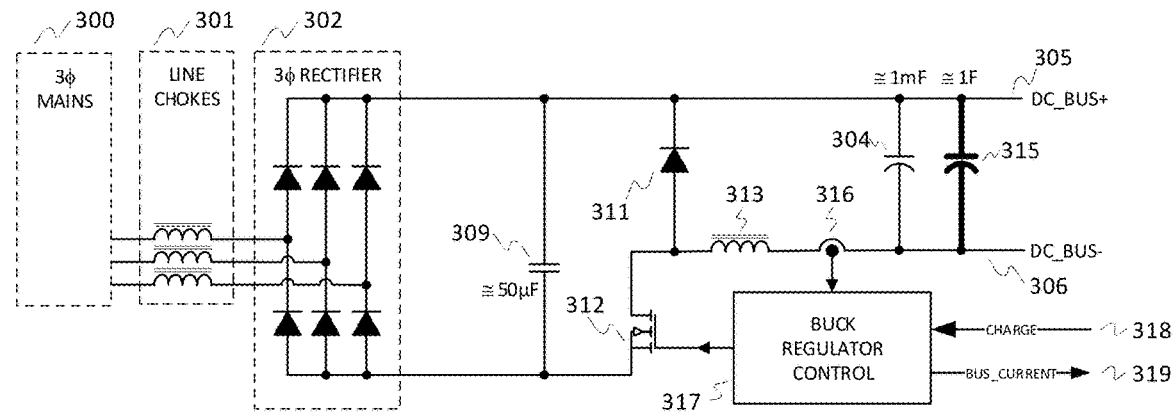
FIG. 3 is a DC link circuit using single-phase buck regulator in accordance with a first embodiment of the disclosed invention.

FIG. 3 illustrates a first embodiment in accordance with the invention. Like numbered elements in FIG. 3 correspond to the similarly numbered elements in FIGS. 1 and 2. The mains supply 300, is presented to line chokes 301 and then to bridge rectifier 302. The value of the first stage smoothing capacitor 309 may be approximately 50 µF. The value of smoothing capacitor 309 is preferably smaller than capacitor 104 because capacitor 309 is only required to provide some smoothing at six times the mains frequency (e.g., 300 Hz/360 Hz) and is not required to hold-up the bus voltage during brown-outs. At power-on, an in-rush current may flow into the DC bus capacitor 309 but the size and duration of the in-rush current will be acceptably low as the in-rush current is restrained by line chokes 301.

Two capacitors 304 and 315 are connected in parallel across the DC bus 305 and 306. Capacitor 304 may be a conventional electrolytic capacitor with a value of approximately 1 mF. A primary purpose of capacitor 304 is to provide a path for the circulation of transient load currents.

Supercapacitor 315 has a value of approximately 1 F. A primary purpose of supercapacitor 315 is to store energy when the loads connected to the DC bus are regenerating and to return that energy when loads connected to the DC bus are motoring. Supercapacitor 315 is physically large and therefore has too much effective series inductance, taking into account the wiring to the supercapacitor, to allow for the circulation of transient load currents. Therefore, capacitor 304 is also required.

Transistor 312, free-wheeling diode 311 and inductor 313 form a buck regulator. As shown in FIG. 3, it is the negative rail of bridge rectifier 302 that is regulated. The output 306 of the buck regulator provides negative DC bus 306.

The buck regulator of FIG. 3 can alternatively and equivalently be implemented with a transistor connected in series with the positive input rail, in which case it is the positive rail of bridge rectifier 302 that is regulated.

The buck regulator is controlled by the buck regulator control circuit 317 in combination with the current sensor 316. The buck regulator control circuit 317 may pulse-width modulate the gate of transistor to cause a fixed, average current to flow through inductor 313. By way of a non-limiting example, if a mains supply is capable of 30 A and the buck regulator control circuit 317 is configured to supply 30 A through inductor 313, the supercapacitor 315 will be fully charged after 532V×1 F/30 A=17.8 ms and this fast pre-charge time may be achieved with minimal power dissipation. It may be appreciated that, in the event of a subsequent momentary interruption to the mains 300, the continued operation of the buck regulator will limit the current flowing through the inductor 313 to 30 A.

Current sensor 316 is illustrated in FIG. 3 as in series with the output inductor 313. This represents an advantageous location but alternative equally practical implementations are possible to sense the current in the source or drain of transistor 312.

Transistor 312 may be implemented as a MOSFET, but the transistor can be any high-speed semiconductor switch such as an IGBT or MOSFET fabricated using silicon, silicon carbide, gallium nitride or other semiconductor.

The buck regulator control circuit 317 may be a subsystem of the overall control system of the machine (not illustrated). The set of input signals 318 to the buck regulator control circuit 317 will include a target current signal and enable/disable signal. The set of output signals 319 from the buck regulator control circuit 317 will include a status signal and bus current signal.

When the pre-charge process is complete, the current at the sensor 316 will be zero and the machine will be ready for operation. At this time, the current control loop in the buck regulator control circuit 317 will saturate (PWM duty cycle goes to 100%) and transistor 312 will be on continuously. It may be appreciated, however, that in the event of an overload condition when operating the machine, the buck regulator will limit the current drawn. The current limit value can be the same as that used to pre-charge the set of bus capacitors 304 and 315 or it can be set to a different level.

The use of a buck circuit, rather than a boost type topology, to pre-charge the bus capacitors 304 and 305 ensures that said capacitors cannot be over-charged. The output of a buck regulator is never more than the input voltage at any duty cycle of the PWM of transistor 312.

It may be noted that the pre-charge algorithm only requires a measurement of the charging current and does not require a measurement of the bus voltage between 305 and 306.

The simple pre-charge algorithm as described above, namely passes a fixed current through the buck regulator, can be termed 'passive' because it does not react to dynamic power draw in the machine, nor does it attempt to regulate the supercapacitor voltage.

The inclusion of supercapacitor 315 may be particularly beneficial in machines that have peaky loads and/or significant regeneration. If the inclusion of supercapacitor 315 is unjustified for a particular machine, then supercapacitor 315 may be omitted without any other hardware change. The remaining capacitor 304 will be fully charged after 532V×1 mF/30 A=17.8 ms. Conversely, if the particular application requires connecting to a supercapacitor of increased value, then such connection is also achieved without any other hardware change. The increased bus capacitance will simply take longer to charge.

As illustrated in FIG. 3, the buck regulator is a single-phase buck regulator, i.e., providing one switch 312, one freewheeling diode 311 and one output inductor 313. At high output currents, however, it may be advantageous to use a buck regulator with more than one phase. These regulators are referred to as multiphase buck regulators.

Figure 4:
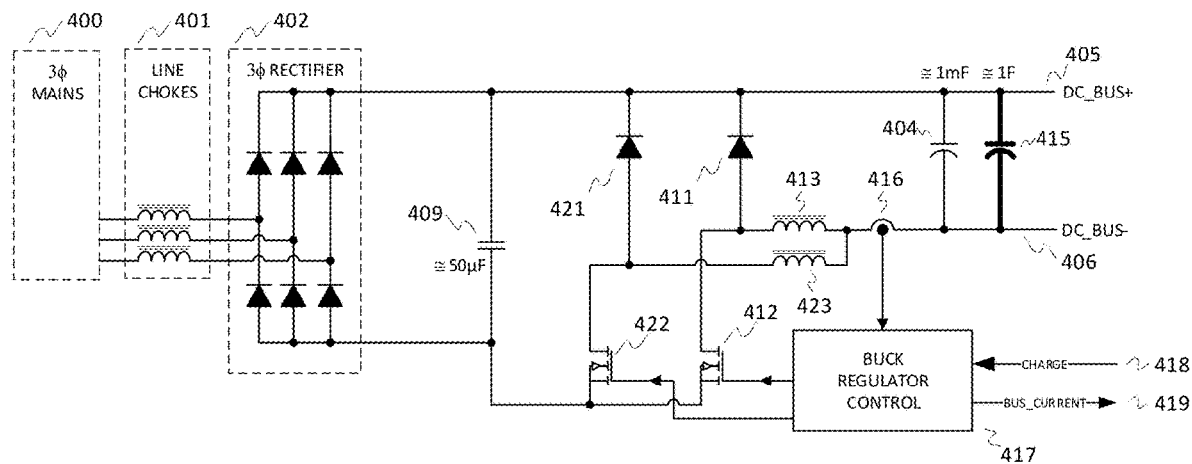
FIG. 4 is a DC link circuit using two-phase buck regulator in accordance with a second embodiment of the disclosed invention.

FIG. 4 illustrates an example of a two-phase buck converter. Like numbered elements in FIG. 4 correspond to the similarly numbered elements in FIGS. 1, 2, and 3. The second phase of the buck converter comprises transistor 422, freewheeling diode 421 and inductor 423. When FIG. 4 is compared to FIG. 3, it may be appreciated that the buck regulator 417 controls two transistors 412 and 422, and that the sum of the current from inductors 413 and 423 flows through current sensor 416.

Having illustrated and described the principles of the disclosed invention, it will be apparent to those skilled in the art that the disclosed embodiments can be modified in implementation and detail without departing from such principles. In view of the many possible embodiments to which the principles of the disclosed invention can be applied, it should be recognized that the illustrated embodiments are only examples of the invention and should not be taken as limiting the scope of the invention. Rather, the scope of the invention is defined by the following claims and their equivalents.

INDEX OF REFERENCE NUMERALS 100 is a mains electrical supply.
101 is a set of line chokes wired in series with each phase of the mains electrical supply.
102 is a bridge rectifier.
103 is a relay with a normally open contact.
104 is a DC bus capacitor
105 is the positive DC bus conductor
106 is the negative DC bus conductor
Elements 205 and 206 correspond to elements 105 and 106, respectively.
299 is a power amplifier for control of an electric motor.
208 is an electric motor.
Elements 300, 301, 302, 304, 305 and 306 correspond to elements 100, 101, 102, 104, 105 and 106, respectively.
309 is a first stage smoothing capacitor.
311 is a free-wheeling diode.
312 is a power transistor or similar high-speed semiconductor switching element.
313 is an output inductor.
315 is a supercapacitor.
316 is a current sensor.
317 is a buck regulator control circuit.
318 is a set of input signals to the buck regulator control circuit.
319 is a set of output signals from the buck regulator control circuit.
Like numbered elements in FIG. 4 correspond to the similarly numbered elements in FIG. 3.
421 is a free-wheeling diode in the second phase of the buck regulator.
422 is a power transistor or similar in the second phase of the buck regulator.
423 is an output inductor in the second phase of the buck regulator.

What is claimed:

1. A power control system, comprising:
an AC power mains;
an input bridge rectifier connected to the AC power mains, the input bridge rectifier having: an upper output rail coupled to an upper DC bus rail; and a lower output rail;
a buck regulator circuit including:
a transistor switch coupled in power output-receiving relationship to the lower output rail of the input bridge rectifier;
a free-wheeling diode connected to a drain of the transistor switch and extending between the drain and the upper output rail; and
an inductor coupled in a power output-receiving relationship to the drain of the transistor on a first side and to the lower DC bus rail on a second side;
a first capacitor extending between the upper output rail and lower DC bus rail that is in parallel with a DC power output bus, the first capacitor receiving current from the buck regulator circuit for initial charging and storing excess regenerative power for subsequent use; and a current sensor connected in series with the buck regulator circuit to directly sense an instantaneous current in the inductor of the buck regulator circuit, the instantaneous current indicative of an incremental change of charge transfer to the first capacitor, wherein:

the transistor switch is controlled, based on the instantaneous current sensed in the inductor, to limit peak output current to the DC power output bus and thus limit the input current and power from the AC power mains.

2. A power control system according to claim 1, further comprising one or more electric motors each coupled to a respective amplifier, each amplifier being powered from the DC power output bus so that energy flows among the amplifiers and a supercapacitor connected to the lower DC bus rail.

3. A power control system according to claim 1, wherein the buck regulator circuit is a multiphase buck regulator circuit.

4. A power control system according to claim 1, further comprising a supercapacitor extending between the upper and low DC bus rails and in parallel with the first capacitor, the supercapacitor configured to store energy when a load is connected to the upper and lower DC bus rails is regenerating, and to return the stored energy when a motor drive connected to the upper and lower DC bus rails is motoring.

5. A power control system according to claim 4, wherein during pre-charge, the buck regulator circuit limits the instantaneous current in the inductor of the buck regulator to a first value pre-charging the first capacitor and supercapacitor, and thereafter limits the instantaneous current in the inductor of the buck regulator to a second value during normal operation whereby the first and second instantaneous current values also indirectly limit the current drawn form the AC power mains.

6. A power control system according to claim 5, wherein completion of the pre-charge of the first capacitor and the supercapacitor is signaled by a PWM duty cycle of the buck regulator circuit saturating at a maximum value.

7. A power control system according to claim 1, further comprising a smoothing capacitor extending between the upper and lower output rails, adjacent the input bridge rectifier.

8. A power control system according to claim 1, further comprising line chokes in power output-receiving relationship to the AC power mains and the input bridge rectifier, the line chokes configured for restraining an in-rush current upon power on of the AC power mains.

9. A power control system according to claim 1, wherein the transistor switch is controlled, based on the instantaneous current sensed in the inductor, by a buck regulator control circuit configured to pulse-width modulate a gate of the transistor switch.

10. A power control system, comprising:

an AC power mains;

an input bridge rectifier connected to the AC power mains, the input bridge rectifier having: an upper output rail coupled to the upper DC bus; and a lower output rail;

a two-phase buck regulator circuit including:

a first transistor switch coupled in power output-receiving relationship to the lower output rail of the input bridge rectifier;

a first free-wheeling diode connected to a drain of the first transistor switch and extending between the drain of the first transistor switch and the upper output rail;

a first inductor coupled in a power output-receiving relationship to the drain of the first transistor on a first side and to a lower DC bus rail on a second side;

a second transistor switch coupled in power output-receiving relationship to the lower output rail of the input bridge rectifier;

a second free-wheeling diode diode connected to a drain of the second transistor switch and extending between the drain of the second transistor switch and the upper output rail;

a second inductor coupled in power output-receiving relationship to the drain of the first transistor on a first side and to the lower DC bus rail on a second side;

a first capacitor extending between the upper output rail and the lower DC bus rail, the first capacitor receiving current from the buck regulator circuit;

a supercapacitor extending between the upper output rail and the lower DC bus rail and in parallel with the first capacitor, the supercapacitor configured to store energy when a load connected to the lower DC bus rail and the upper output rail is regenerating, and to return the energy when a load connected to the lower DC bus rail and the upper output rail is motoring; and a current sensor connected in series with the two-phase buck regulator circuit to directly sense instantaneous currents in the first and second inductors of the two-phase buck regulator circuit, the instantaneous currents indicative of an incremental change of charge transfer to the first capacitor, wherein the first and second transistor switches are controlled to limit pre-charge current of the first capacitor and the supercapacitor, based on the instantaneous currents sensed in the inductors, and to limit peak output current to the DC power output bus and thus limit an input power from the AC power mains.

11. A power control system according to claim 10, further comprising a smoothing capacitor extending between the upper and lower output rails, adjacent the input bridge rectifier.

12. A power control system according to claim 10, further comprising line chokes in power output-receiving relationship to the AC power mains and the input bridge rectifier, the line chokes configured for restraining an in-rush current upon power on of the AC power mains.

13. A power control system according to claim 10, wherein the first and second transistor switches are controlled, based on a sum of the instantaneous currents sensed in the first and second inductors, by a buck regulator control circuit configured to pulse-width modulate a gate of the first and second transistor switches.

14. A power control system according to claim 10, further comprising an electric motor with an amplifier connected to the lower DC bus rail and the upper output rail.

15. A DC link circuit between a rectified AC mains and a motor drive, the DC link circuit comprising:

a first input rail and a second input rail connected to the rectified AC mains, wherein the first input rail connects to a first input terminal of the motor drive;

a buck regulator circuit connected to the second input rail, the buck regulator having a first output rail extending to a second input terminal of the motor drive;

a buck regulator control circuit configured to control operation of the buck regulator circuit;

a DC bus capacitor extending between the input terminals of the motor drive to provide a path for circulation of transient load currents;

a supercapacitor extending between the input terminals of the motor drive, wherein the supercapacitor is configured to store energy when the motor drive is regenerating energy and provide peak energy when the motor drive is motoring;

a current sensor connected to the buck regulator circuit to generate a signal indicative of an instantaneous current in the buck regulator circuit and provide the signal to the buck regulator control circuit, wherein:

during a soft start process when the DC bus capacitor and the supercapacitor are charging, the buck regulator control circuit only monitors the charging current to control the buck regulator circuit to prevent overcharging by limiting a peak output; and during normal operation in supplying power to the load, the buck regulator control circuit causes a fixed, average current to flow through the buck regulator circuit and the supercapacitor provides the peak power to the motor drive while limiting a peak power draw from the AC mains.

16. A DC link circuit according to claim 15, wherein the buck regulator circuit includes:

a transistor switch coupled in power output-receiving relationship to the lower output rail for regulating the lower output rail and during normal operation, the transistor switch is continuously on;

a fie-wheeling diode extending between a drain of the transistor switch and the upper output rail so that when the transistor switch is off, current flows through the fee-wheeling diode; and an inductor connected in series with the drain configured so that a fixed, average current flows through the inductor.

17. A DC link circuit according to claim 16, wherein the transistor switch is controlled, based on the instantaneous current sensed in the inductor, to limit peak output current of the lower DC bus rail and thus limit an input from the AC mains.

18. A DC link circuit according to claim 15, wherein the instantaneous current indicates an incremental change of charge transfer to the supercapacitor so that current drawn from the AC mains is limited.

19. A DC link circuit according to claim 15, wherein the DC bus capacitor has a value of approximately 1 mF and the supercapacitor has a value of approximately 1 F.

20. A DC link circuit according to claim 15, further comprising a third capacitor connected in parallel with the rectified AC mains to provide smoothing.

* * * * *